(12) United States Patent
Hagiu et al.

(10) Patent No.: US 8,856,804 B2
(45) Date of Patent: Oct. 7, 2014

(54) PERFORMANCE INDICATOR FOR MEASURING RESPONSIVENESS OF USER INTERFACE APPLICATIONS TO USER INPUT

(75) Inventors: Costin Hagiu, Sammamish, WA (US); Wilhelm R. Schmieder, Snoqualmie, WA (US); Gabriel Hera, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1742 days.

(21) Appl. No.: 12/028,707

(22) Filed: Feb. 8, 2008

(65) Prior Publication Data

US 2009/0204975 A1 Aug. 13, 2009

(51) Int. Cl.
| | |
|---|---|
| G06F 9/44 | (2006.01) |
| G06F 9/54 | (2006.01) |
| G06F 11/34 | (2006.01) |
| G06F 9/00 | (2006.01) |
| H04L 29/08 | (2006.01) |

(52) U.S. Cl.
CPC .......... G06F 9/542 (2013.01); *G06F 2201/805* (2013.01); *G06F 2201/88* (2013.01); *H04L 67/10* (2013.01); G06F 11/3419 (2013.01)
USPC .......................................... 719/314; 709/226

(58) Field of Classification Search
USPC ....................................................... 719/314
See application file for complete search history.

(56) References Cited

U.S. PATENT DOCUMENTS

| | | | |
|---|---|---|---|
| 5,790,117 A | 8/1998 | Halviatti et al. | |
| 6,078,321 A | 6/2000 | Simonoff et al. | |
| 6,151,569 A | 11/2000 | Elliott | |
| 6,341,260 B2 * | 1/2002 | Klein et al. | 702/186 |
| 6,366,879 B1 | 4/2002 | Coxhead et al. | |
| 6,604,150 B1 * | 8/2003 | Gebhart et al. | 719/328 |
| 6,665,566 B1 * | 12/2003 | Shibata et al. | 700/7 |
| 6,850,257 B1 | 2/2005 | Colleran et al. | |
| 7,000,100 B2 | 2/2006 | Lacombe et al. | |
| 7,124,402 B2 | 10/2006 | Chamberlain | |
| 2002/0042823 A1 * | 4/2002 | DeBettencourt et al. | 709/224 |
| 2003/0041142 A1 * | 2/2003 | Zhang et al. | 709/224 |
| 2004/0193678 A1 * | 9/2004 | Trufinescu et al. | 709/203 |
| 2005/0018611 A1 * | 1/2005 | Chan et al. | 370/241 |
| 2005/0183092 A1 * | 8/2005 | Christensen et al. | 719/313 |
| 2006/0085698 A1 | 4/2006 | Klementiev | |
| 2010/0040222 A1 * | 2/2010 | Anderson et al. | 379/266.01 |

OTHER PUBLICATIONS

Su Ping "Delay Measurement Time Synchronization for Wireless Sensor Networks" Jun. 2003.*

(Continued)

*Primary Examiner* — H S Sough
*Assistant Examiner* — Abdou Seye
(74) *Attorney, Agent, or Firm* — Jim Sfekas; Kate Drakos; Micky Minhas

(57) ABSTRACT

A method for measuring application responsiveness measures the time elapsed between receiving and processing a trailing tag message inserted into the application's message queue. The method receives a message, generates a trailing tag message associated with the message, and inserts the trailing tag message into the application's message queue. The trailing tag message includes a timestamp indicating when the trailing tag message was queued. A default message handler calculates the time elapsed between when the trailing tag message was queued and when the trailing tag message was processed. The elapsed time may then be used to calculated system responsiveness.

19 Claims, 7 Drawing Sheets

(56) References Cited

OTHER PUBLICATIONS

Howell, et al., "An Examination of the Runtime Performance of GUI Creation Frameworks", at <://delivery.acm.org/10.1145/960000/957342/p171-howell.pdf?key1=957342&key2=1376121911&coll=GUIDE&dl=GUIDE&CFID=1252115&CFTOKEN= 25774704>>, PPPJ, 2003, pp. 171-176.

Tague, et al., "Some Measures and Procedures for Evaluation of the User Interface in an Information Retrieval System", at <://delivery.acm.org/10.1145/70000/62477/p371-tague.pdf?key1=62477&key2=6189221911&coll=ACM&dl=ACM&CFID=1266917&CFTOKEN=97596779>>, ACM, 1988, pp. 371-385.

* cited by examiner

PERFORMANCE INDICATOR FOR MEASURING RESPONSIVENESS OF USER INTERFACE APPLICATIONS TO USER INPUT

BACKGROUND

A graphical user interface (GUI) is a means of controlling a computer application through the use of icons, buttons, and pointers. The user of a GUI typically uses a computer mouse and keyboard to submit commands to the desired application. In response to these commands, the application typically performs some processing and may optionally update the computer's display. Responsiveness is measured by how much time it takes for the computer to process the user command, otherwise known as the message. Responsiveness is an important consideration in measuring the usability of a GUI application, and in determining the usability of a computer system as a whole. Measuring the usability of a computer system is desirable diagnose and potentially prevent a poor user experience.

Measuring application or system-wide responsiveness has traditionally been achieved by one of two methods. The first method is to gauge responsiveness indirectly by measuring CPU usage, disk I/O throughput, memory usage, network bandwidth, or other hardware usage indicators. Once certain thresholds are crossed, insufficient resource levels may indicate a decrease in overall system performance, and consequently a decrease in responsiveness. This method is flexible because it does not require application specific knowledge. However, this method does not actually directly measure responsiveness, and therefore is an inaccurate and unreliable.

The second method of measuring application responsiveness is to gauge responsiveness of known functions performed by known applications in response to a known user input. This is achieved by measuring the time elapsed between a known input is received and the corresponding result is displayed. While this method measures actual response time, the method is application specific, making it difficult to generalize. For example, by knowing that the key sequence "ctrl+f" will cause a word processing application to display a "find" dialog box, it is possible to measure the time elapsed between the "ctrl+f" and when the resulting "find" dialog box is displayed. However, a web browser application may respond to the same "ctrl+f" input with a different "find" dialog box that might not be found, or no dialog box at all. In either case, knowledge of the word processor application is application specific, and does not enable measuring responsiveness of any other application. Because this method of measurement requires knowledge of application specific semantics, it is cumbersome, expensive, and must constantly be updated as new applications are released.

Unfortunately, developing application specific measures of responsiveness increases the cost and complexity of measuring system-wide responsiveness, and it would be impractical to implement application specific measures for all existing and yet to be developed applications. Also, measuring system-wide application responsiveness indirectly by measuring available system resources is inaccurate.

SUMMARY

A system and method for measuring application responsiveness measures the time elapsed between inserting a trailing tag message into a message queue and processing the trailing tag message in a default message handler. In one implementation, the method receives a message, generates a trailing tag message associated with the message, and inserts the trailing tag message into the applications message queue. The trailing tag message may include a timestamp indicating when the trailing tag message was queued. A default message handling function processes the trailing tag message, measuring the time elapsed between when the trailing tag message was queued and when the trailing tag message was processed. Because responsiveness of all messages from all applications is measured, no application specific knowledge is required to measure overall system responsiveness. Additionally, because responsiveness is being measured, and not a proxy of responsiveness, this method may be reliably used in production environments.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to measuring responsiveness of user interface applications to user input. In some of the described implementations, responsiveness is calculated at least in part by measuring the time it takes to process a trailing tag message inserted into the application's message queue. A trailing tag message is created and associated with a message, such as a window message generated by a keyboard or mouse action. The trailing tag message is inserted into the application's message queue after the corresponding message has been inserted. The trailing tag message may include a timestamp to indicate approximately when the message was queued. After the message is processed, the associated trailing tag message will be processed by a default message handler. The default message handler will calculate the time elapsed from the insertion of the trailing tag message into the application message queue until the processing of the trailing tag message. This elapsed time will closely approximate the time it took for the message to be processed. The time in which the message was processed includes the time elapsed waiting in the application message queue and the time elapsed as the application processed the message. This elapsed time is indicative of system responsiveness, reflecting generally how long the system currently requires to process a message and to display a result.

In some embodiments, the system that calculates application response time is a terminal server. A terminal server may support an arbitrary number of remote desktop clients, limited only by available system resources. Allowing too many remote desktop client connections will degrade the terminal server's responsiveness, resulting in a poor user experience. On the other hand, artificially limiting the number of remote desktop client connections underutilizes costly system resources. Therefore there is a need to accurately measure system responsiveness across one or more remote desktop client sessions.

Messages may originate from a remote desktop client or from a local console. In one embodiment, the system being measured may support multiple concurrent users, each running a remote desktop client. Response times from all applications running on the system may be averaged into a system-wide application response time. A computer administrator may monitor changes to the average system response time. The computer administrator may optionally determine an optimal number of remote desktop client users based on this information.

Figure 1:
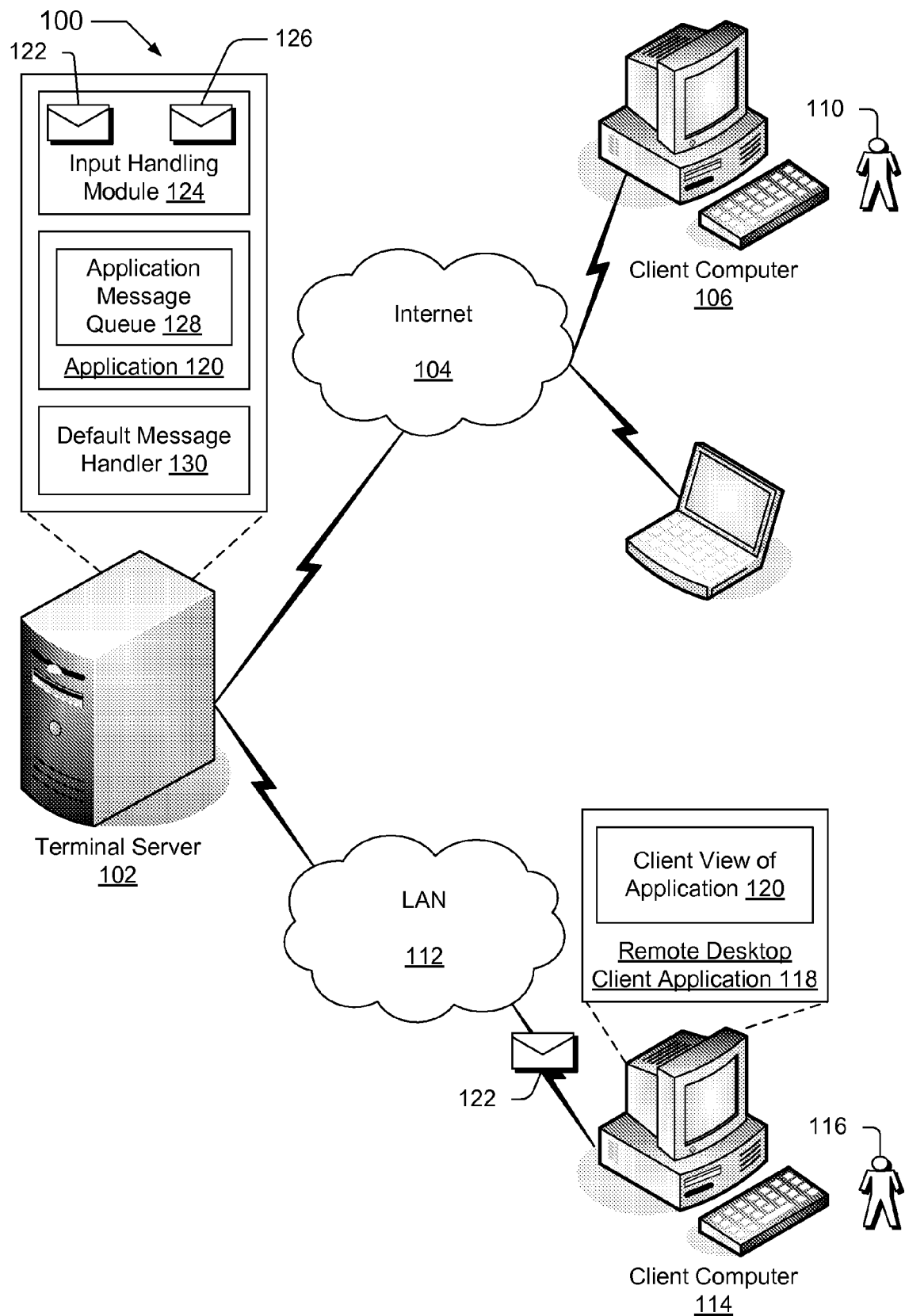
FIG. 1 depicts an illustrative terminal server in a network environment.

Performance Indicator for Measuring Responsiveness of User Interface Applications to User Input FIG. 1 shows a networked environment 100 including a terminal server 102 connected by a network to a number of client computers. In one embodiment, the terminal server 102 is connected to a client computer 106 and a client computer 108 through an internet 104. The client computers 106 and 108 are operated by a user 110. In another embodiment the terminal server 102 is connect to a client computer 114 through a local area network (LAN) 112. This client computer 114 is operated by a user 116. Additionally environment 100 may couple other computer devices via other types of networks, such as wi-fi networks, cell phone networks, or a VPN networks.

In one embodiment, the user 116 launches a remote desktop client application 118 on the client computer 114 and initiates a remote desktop connection to the terminal server 102. The user then launches an application 120, located on the terminal server 102, and begins to control the application 120 by sending a message 122 to the terminal server 102. This message may comprise key press messages, button click messages, or mouse move messages, among other window messages, as described in detail below. The message 122 may be a user input message, an application input message, or a message that's primary purpose is to trigger the system responsiveness measuring mechanism.

A client view of the application 120 is displayed by the remote desktop client application 118 on the client computer 114. An input handling module 124, integral with or accessible by the terminal server 102, receives the message 122. The input handling module 124 then generates a trailing tag message 126 and queues the trailing tag message 126 in an application message queue 128 associated with the application 120. The trailing tag message 126 may comprise a probe message. Note that the created trailing tag message 126 may indicate a time at which this message was created and/or queued.

The application 120, meanwhile, processes any existing messages in the application message queue 128, up to and including the message 122. The application 120 then receives the trailing tag message 126 from the application message queue 128. The application 120 invokes a default message handler 130 to process the trailing tag message 126. The default message handler 130 calculates the time elapsed between the creation of the trailing tag message 126 (and/or when the message was queued) by the input handling module 124 and the processing of the trailing tag message 126 by the default message handler 130. This elapsed time measures the time consumed by the terminal server 102 responding to the message 122. User 110 operating additional client computers 106 and 108 may connect to the terminal server 102 and initiate remote desktop client applications, consuming system resources, and increasing system response time. As such, knowledge of system responsiveness helps to determine when a terminal server may accept additional remote desktop connections while maintaining a high level of usability.

Figure 2:
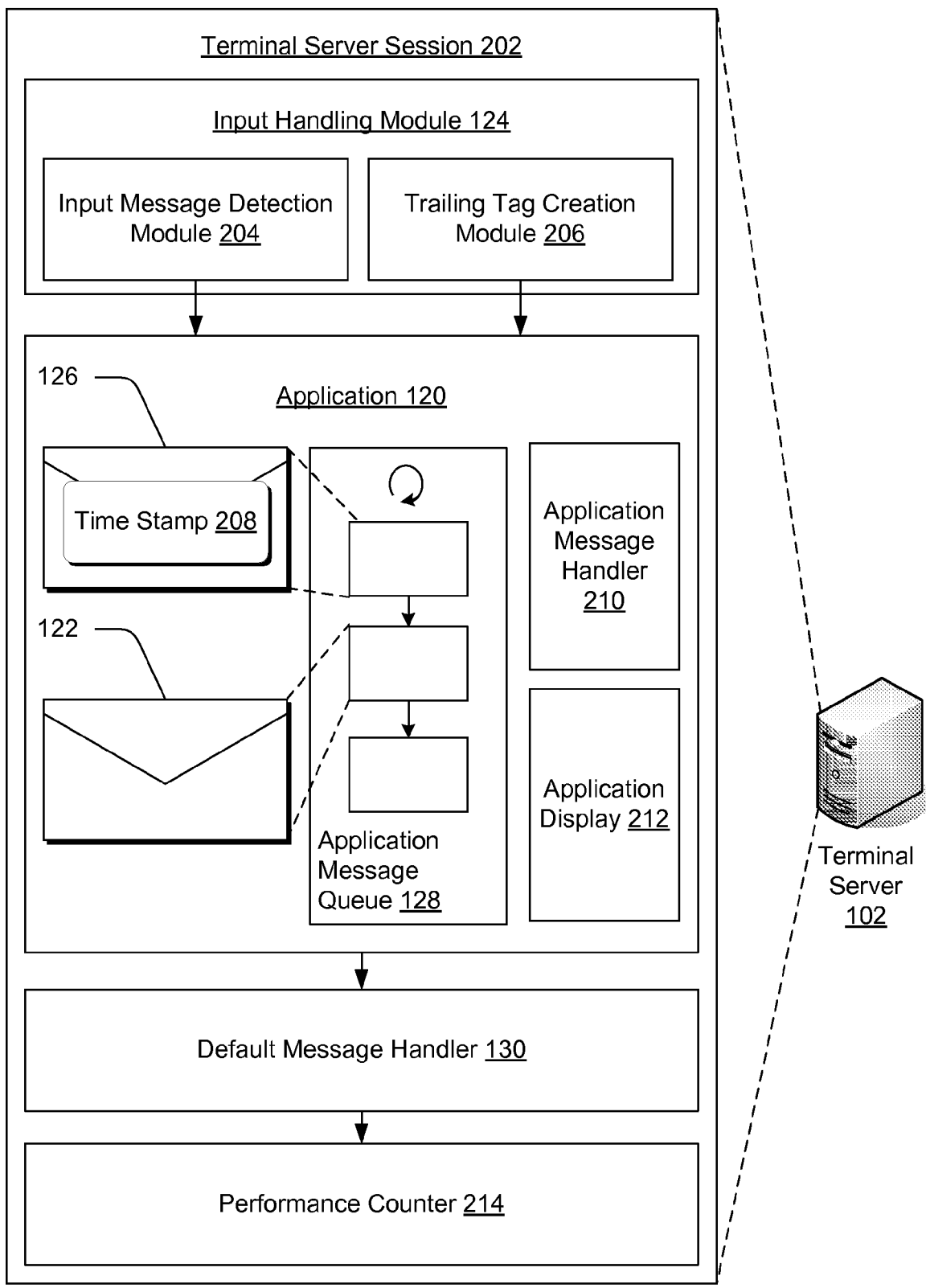
FIG. 2 depicts an illustrative terminal server comprising modules used to measuring responsiveness of user interface applications.

FIG. 2 depicts the terminal server 102 from FIG. 1. The terminal server 102 comprises a terminal server session 202, which is created in response to the initial remote desktop connection of the remote desktop client application 118. The terminal server session 202 comprises the input handling module 124, the application 120, the default message handler 130, and a performance counter 214. The performance counter 214 may be a system-wide performance counter or a session specific performance counter. The input handling module 124, meanwhile, here comprises an input message detection module 204 and a trailing tag creation module 206.

Upon receiving the message 122 from the remote desktop client application 118, the terminal server 102 forwards the message 122 to the terminal server session 202. If there is more than one terminal server session 202 active on the terminal server 102, the message 122 is forwarded to the terminal server session 202 associated with the remote desktop client application 118 that sent the message. The terminal server session 202 then forwards the message 122 to the input message detection module 204. Upon receiving the message, the input message detection module 204 queues the message 122 in the application message queue 128 of application 120. Once the message 122 has been inserted into the application message queue 128, the trailing tag creation module 206 creates the trailing tag message 126. Note that while in the described implementation the trailing tag message 126 is created on-demand, in other implementations this message may already be created and may simply be placed into the application message queue 128 in response.

Here, the trailing tag message 126 includes or is associated with a time stamp 208 which stores the time at which the trailing tag message 126 was created. In another embodiment, the time stamp 208 contains the time the message 122 was queued. In one embodiment, the trailing tag message 126 is queued in the application message queue 128 immediately following the message 122. The proximity of the trailing tag message 126 and the message 122 enables the default message handler 130 to measure how long application 120 took to process the message once queued.

Once queued, the message 122 and the trailing tag message 126 wait until the application 120 processes all of the previously queued messages. Each message in the application message queue 128 is removed from the queue in the order in which it was inserted (so called "First In First Out" (FIFO)). Each message in turn is processed by an application message handler 210, integral with or accessible by the application 120. In one embodiment, the application message handler 210 is a window procedure. The application message handler 210 may not be programmed to process all types of messages. If a message is not processed by the application message handler 210, the message is passed on to the default message handler 130 for processing. In one embodiment, certain messages, called system messages, should rarely or never be processed by an application message handler. Instead, these messages should usually or always be forwarded to a default message handler to be processed. In one embodiment, the trailing tag message is a system message and, hence, passes through to the default message handler 130.

Once all of the previously-queued messages have been processed by the application message handler 210 or the default message handler 130, the message 122 is dequeued and processed. Processing the message 122 may include updating an application display 212. Processing may cause the client view of the application 120 to synchronously update. In another embodiment, processing the message 122 does not include updating the client view of the application 120 on the client computer 114. In this embodiment, updates to the application display 212 occur locally, within the application 120; network latency is not measured. In this embodiment, the terminal server session 202 will independently transmit the updated application display 212 to the remote desktop client 118.

For example, if the message 122 indicated a button had been pushed, the application display 212 would be updated to reflect the pushed state of the button. This update to the application display 212 may occur entirely within the terminal server 102. In this embodiment, the remote desktop client application 118 will receive an update reflecting the change in the application display 212. The time required to transmit this update may not be considered. This described embodiment measures responsiveness of the server rather than the responsiveness of the network over which the commands are sent. In other embodiments, updates to the application display are synchronously transmitted from the terminal server 102 to the remote desktop client 118. In this embodiment, the time required to transmit the update often is included in calculating responsiveness.

Once the message 122 has been processed, the trailing tag message 126 is dequeued by the application message handler 210. The application message handler 210 determines that the trailing tag message is a system message, and invokes the default message handler 130 for processing. In one embodiment, the default message handler 130 calculates the elapsed time by subtracting the time stamp 208 from the current time. In one embodiment, the elapsed time is transmitted to the performance counter 214. The performance counter 214 stores the elapsed time, and aggregates the elapsed time with elapsed time values originating from other applications in the session. Optionally, average elapsed time values for each session may be calculated, or all elapsed time values from all sessions may be averaged across the entire system.

In one embodiment, the default message handler 130 is a default window procedure. Additionally, the default message handler 130 may be the same default message handler shared by many or all applications running in multiple or all terminal server sessions on the terminal server 102. The universal nature of the input handling module 124 and the default message handler 130 ensure that all messages are followed by trailing tag messages and that all trailing tag messages are processed. As such, responsiveness of substantially all or all messages is measured. The universal nature of the default message handler 130 and the input handling module 124 enables one embodiment to measure responsiveness in some applications or all applications, independent of particular application semantics.

Figure 3:
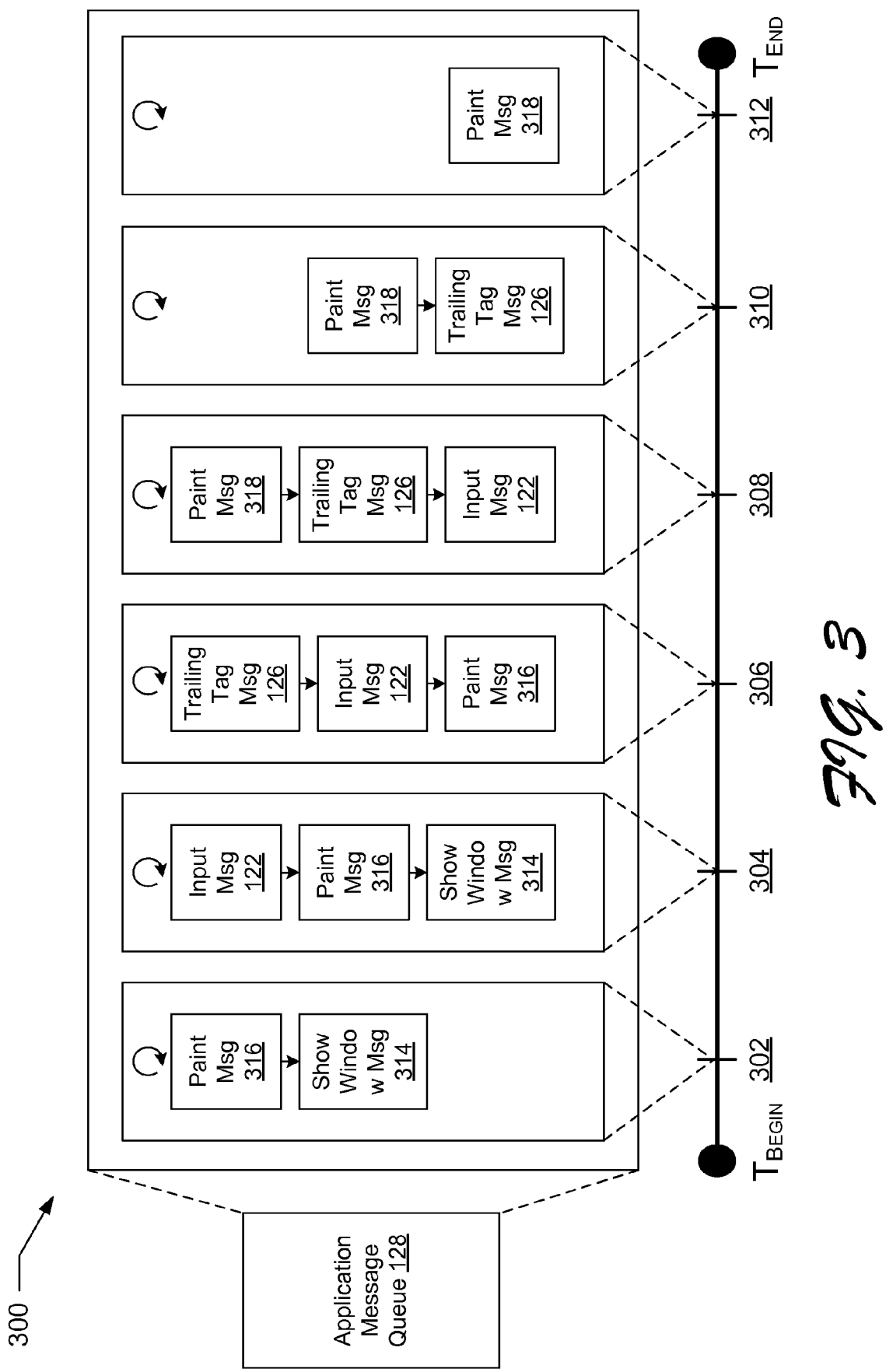
FIG. 3 depicts an illustrative timeline of an application message queue as a message and a trailing tag message are processed.

FIG. 3 depicts an illustrative timeline 300 containing states of the application message queue 128 as the message 122 is processed from time $T_{Begin}$ to $T_{End}$. At a time 302 a show window message 314 and a paint message 316 are already queued. These messages are typical messages one would find in a message queue. At a time 304 the input message 122 is queued. At a time 306 the show window message 314 has been removed from the application message queue 128 and processed, while the trailing tag message 126 has been queued. The trailing tag message may in one embodiment be queued at virtually the same time. The time stamp 208 may be set equal to the time 306. Alternatively, a timer associated with the trailing tag message 126 may be set to an initial time such as 0:00. At a time 308 the paint message 316 has been removed from the application message queue 128 and processed, and a new paint message 318 has been queued. At a time 310 the input message 122 has been removed from the application message queue 128 and processed. At a time 312 the trailing tag message 126 has been removed from the application message queue 128 and processed by the default message handler 130. In one embodiment, the default message handler 130 has subtracted the time at which the trailing tag message 126 was processed, somewhere between the time 310 and the time 312, from the time stamp 208. The resulting elapsed time may be stored in the performance counter 214. Alternatively, the default message handler 130 may have stored the value of the timer associated with the trailing tag message 126 in the performance counter 214. As described below with reference to FIG. 5, this elapsed time may be helpful in calculating system responsiveness within a particular session or responsiveness of the terminal server 102 generally.

Figure 4:
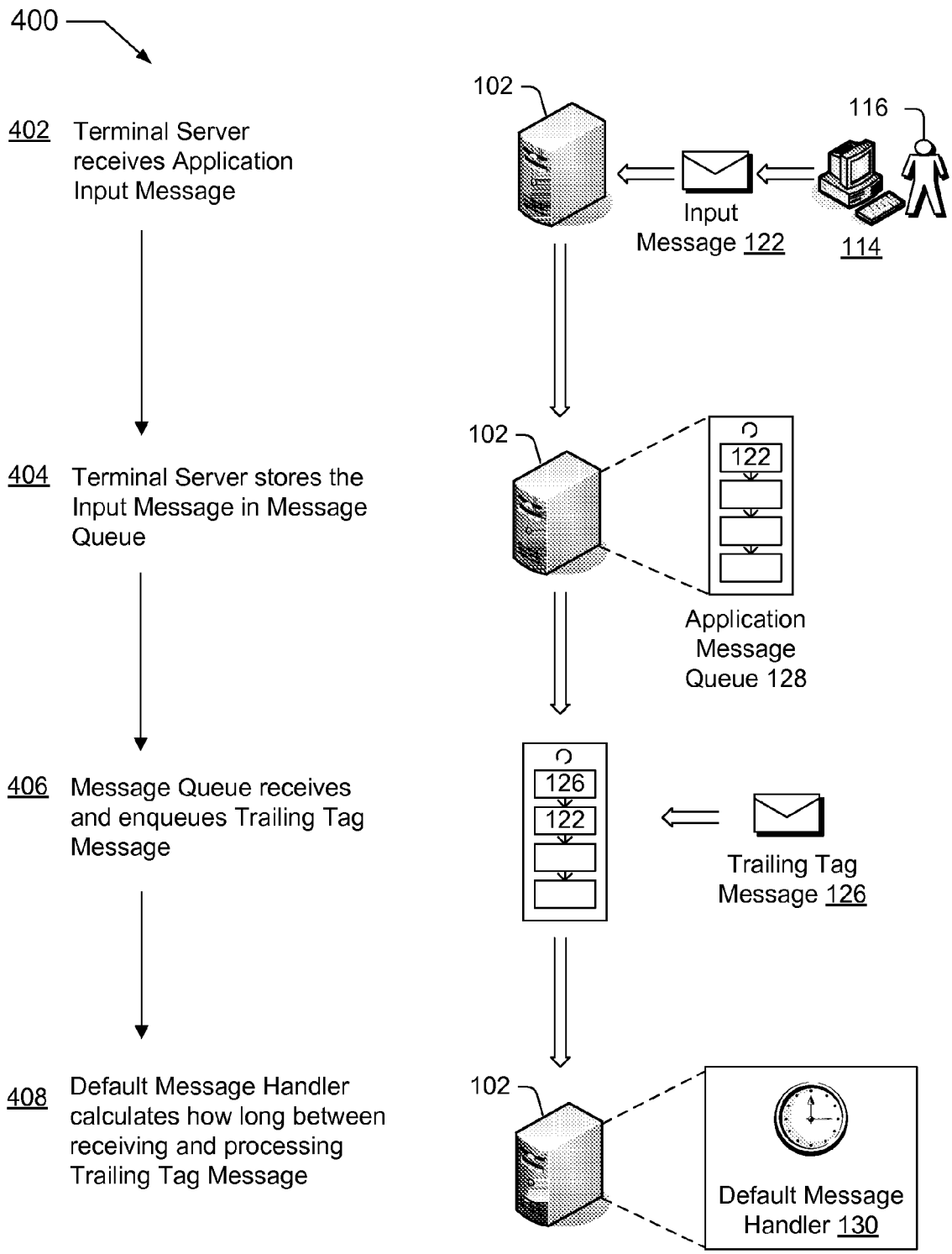
FIG. 4 depicts an illustrative process which allows a terminal server to calculate system responsiveness.

With the environment, devices, and timeline of FIGS. 1-3 in mind, FIG. 4 depicts an illustrative process 400 for measuring application responsiveness to user input. At an operation 402 the terminal server 102 receives the message 122 from the client computer 114 in response to some input from the user 116. At an operation 404 the terminal server 102 stores the message 122 in the application message queue 128. At an operation 406 the application message queue receives and queues the trailing tag message 126. At an operation 408 the default message handler 130 calculates the time elapsed between when the trailing tag message 126 was queued and when the trailing tag message 126 was processed by the default message handler. This elapsed time is used to approximate the time elapsed from when the application input message 122 was received by the terminal server 102 and when processing of the application input message 122 was complete.

Figure 5:
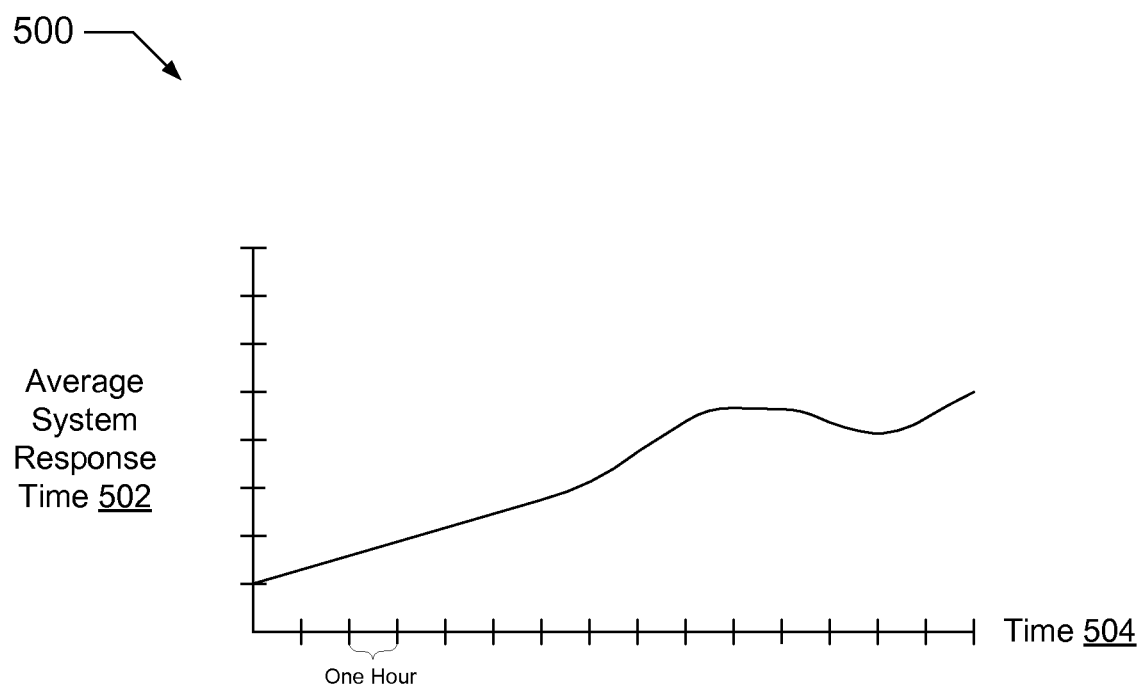
FIG. 5 depicts an illustrative graph of average system response time.

FIG. 5 depicts an illustrative graph 500 indicating an average response time 502 over a time axis 504. The average response time 502 may represent an absolute number, or in another embodiment may indicate a relative response time. A relative response time may be used to discern a change in the average system response time over time. In one embodiment, the performance counter 214 calculates the average system response time 502. The illustrative graph 500 may optionally include average system response time for a particular session, or for the system as a whole.

Figure 6:
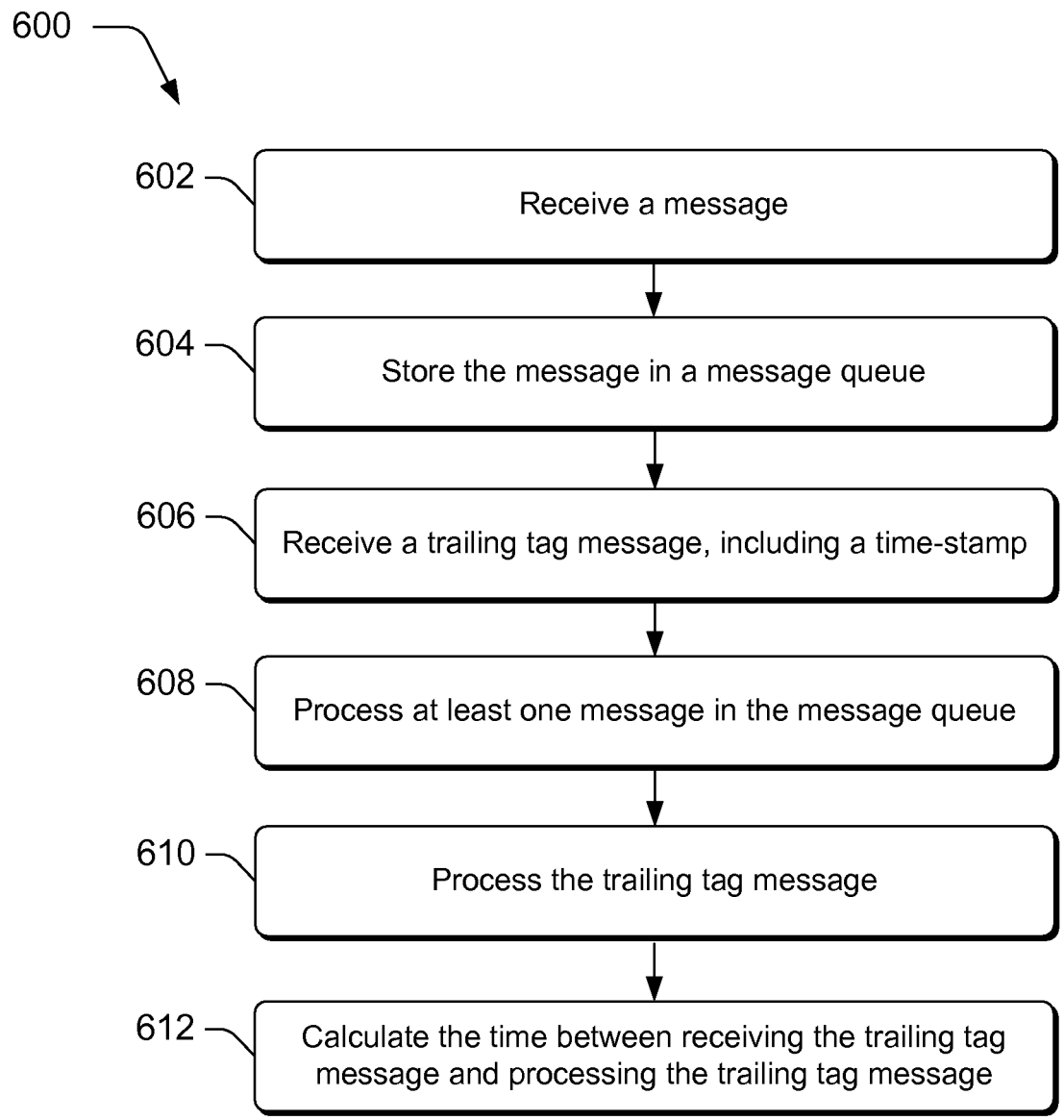
FIG. 6 depicts an illustrative process for calculating response time to a message.

FIG. 6 depicts an illustrative process 600 for calculating a system responsiveness using the message 122. At an operation 602 the message 122 is received by the terminal server 102, and routed to the appropriate terminal server session 202. The terminal server session 202 routes the received message 122 to the appropriate application or window.

At an operation 604 the application message queue 128 of the application 120 stores, or queues, the message 122. The trailing tag creation module 206 generates the trailing tag message 126, including a timestamp, and at an operation 606, queues the trailing tag message 126 into the application message queue 128. The timestamp included in the trailing tag message 126 may indicate when the trailing tag message was queued in the application message queue 128. In one embodiment, the trailing tag message 126 is queued immediately after the message 122. At an operation 608 at least one message in the message queue is processed. At an operation 610 the trailing tag message 126 is processed by the default message handler 130. At an operation 612 the default message handler calculates the time from when the trailing tag message 126 was received by the application message queue 128 and the time when the trailing tag message 126 was processed by the default message handler 130.

Figure 7:
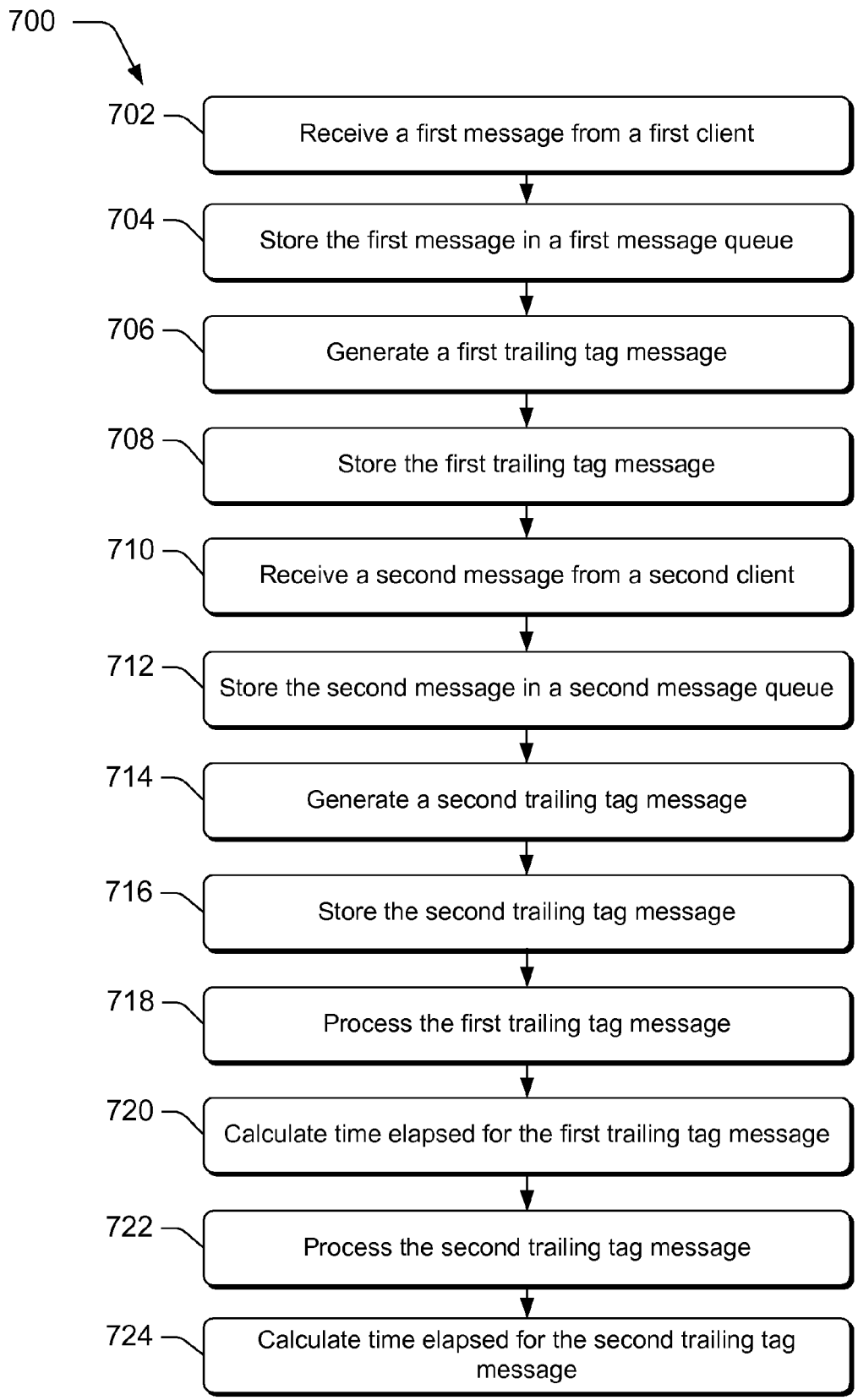
FIG. 7 depicts an illustrative process for calculating a response time for two messages originating from different remote desktop client applications.

FIG. 7 depicts an illustrative process 700 for calculating a system responsiveness using two messages 122 from different remote desktop client applications 118. At an operation 702 a first message is received by the terminal server 102 from the client computer 114, and routed to the appropriate terminal server session 202. At an operation 704 the terminal server session queues the first message in a first message queue. At an operation 706 a first trailing tag message is generated. The first trailing tag message may be associated with the first message, and may include a timestamp indicating when the first trailing tag message was generated. The first trailing tag message may also be generated virtually immediately after the first message is queued. At an operation 708 the first trailing tag message is queued in the first message queue. At an operation 710 a second message is received by the terminal server 102 from the client computer 116, and routed to the appropriate terminal server session 202. The second message may be routed to a different terminal server session 202 than the first message. At an operation 712 the terminal server session queues the second message in a second message queue. At an operation 714 a second trailing tag message, which may be associated with the second message, is generated. The second trailing tag message may include a timestamp indicating when the second trailing tag message was generated. At an operation 716 the second trailing tag message is queued in a second message queue. At an operation 718 the first trailing tag message is processed by a default message handler 130. At an operation 720 a first elapsed time is calculated. The first elapsed time may measure the time between when the first trailing tag message was generated at the operation 706 and when the first trailing tag message was processed at the operation 718. At an operation 722 the second trailing tag message is processed by the default message handler 130. At an operation 724 a second elapsed time is calculated. The second elapsed time may measure the time between when the second trailing tag message was generated at the operation 714 and when the second trailing tag message was processed at the operation 722.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   receiving a message;
   storing the message in a message queue;
   receiving, into the message queue and at least partly in response to storing the message in the message queue, a trailing tag message associated with the stored message, the trailing tag message comprising a time stamp that indicates a time when the trailing tag message was received and being queued at a position in the message queue after the message;
   processing the message at a first message handler;
   determining that the trailing tag message is a particular type of message;
   processing, at least partly in response to determining that the trailing tag message is the particular type of message, the trailing tag message at a second message handler designated to process the particular type of message; and
   calculating a time period between receiving the trailing tag message and processing the trailing tag message based at least in part on the time stamp of the trailing tag message, the calculated time period indicating an approximated elapsed time between receiving the message and processing the message.

2. A method as described in claim 1, wherein the trailing tag message is free of application-specific information.

3. A method as described in claim 1, wherein the trailing tag message is free of system-specific information.

4. A method as described in claim 1, further comprising approximating a system-response time at least in part based on the time period between receiving the trailing tag message and processing the trailing tag message.

5. A method as described in claim 1, wherein the trailing tag message is a first trailing tag message and the time period is a first time period, and further comprising detecting a system slow down by averaging the first time period between receiving the first trailing tag message and processing the first trailing tag message with a second time period between receiving a second trailing tag message and processing the second trailing tag message.

6. A method as described in claim 5, wherein the first time period and/or second time period are made available through a performance application programming interface (performance API) that exposes performance data.

7. A method as described in claim 5, wherein the message is a first message, and wherein the first trailing tag message corresponds to the first message and the second trailing tag message corresponds to a second message.

8. A method as described in claim 7, wherein the first message originates, in response to user input, from a first computer desktop session and the second message originates, in response to user input, from a second computer desktop session.

9. A method as described in claim 8, wherein the first computer desktop session and the second computer desktop session comprise terminal server sessions.

10. A method as described in claim 1, wherein the trailing tag message comprises a system message designed to be handled by an operating system of a computing device that processes the trailing tag message.

11. A system comprising:
    one or more processors; and
    one or more computer-readable media storing executable instructions that, when executed by the one or more processors, cause the one or more processors to perform acts comprising:
    receiving a user input message;
    storing the user input message in a message queue;
    receiving, at least partly in response to storing the user input message in the message queue, a probe message associated with the user input message, the probe message indicating a time when the probe message was received and being received into the message queue at a position after the user input message;
    processing the user input message in the message queue in an application message handler configured to process user input messages;
    processing the probe message in a default message handler configured to process probe messages; and
    calculating a time period between receiving the probe message and processing the probe message based at least in part on the time indicated in the probe message, the calculated time period indicating an approximated elapsed time between receiving the user input message and processing the user input message.

12. The system of claim 11, wherein the probe message comprises a system message not processed by the application message handler.

13. The system of claim 11, wherein the user input message comprises a keyboard input.

14. The system of claim 11, wherein the user input message comprises a mouse input.

15. The system of claim 11, wherein the probe message is a first probe message and the time period is a first time period, and the acts further comprise detecting a system-wide slow down by averaging the first time period between receiving the first probe message and processing the first probe message with a second time period between receiving a second probe message and processing the second probe message.

16. The system of claim 15, wherein the average time period is made available through a performance API for exposing performance information.

17. The system of claim 11, wherein the acts further comprise detecting an increase in system response time by calculating an average time between receiving the probe message and processing the probe message.

18. The system of claim 11, wherein the acts further comprise detecting a reduction in system responsiveness by calculating an increase in an average time between receiving the probe message and processing the probe message.

19. A method implemented at least in part by a computing device, comprising:

receiving, at the computing device, a first message from a first terminal server session;

storing, by the computing device, the first message in a first message queue;

generating a first trailing tag message associated with the first message, the first trailing tag message indicating when the first trailing tag message was generated;

storing the first trailing tag message in the first message queue;

receiving, at the computing device, a second message from a second terminal server session;

storing, by the computing device, the second message in a second message queue;

generating a second trailing tag message associated with the second message, the second trailing tag message indicating when the second trailing tag message was generated;

storing the second trailing tag message in the second message queue;

processing the first trailing tag message in a default message handler;

calculating a first time period based on a time elapsed between generating the first trailing tag message and processing the first trailing tag message;

processing the second trailing tag message in the default message handler;

calculating a second time period based on a time elapsed between generating the second trailing tag message and processing the second trailing tag message;

averaging the first time period and the second time period; and exposing the average through a performance API for exposing performance information.

\* \* \* \* \*